Dec. 19, 1967    L. L. BROWNING, JR    3,358,521

ADJUSTABLE TIGHTENER

Filed Oct. 21, 1965

INVENTOR

LAURANCE L. BROWNING, JR.,

BY *Yungblut, Melville, Strasser and Foster*
ATTORNEYS

United States Patent Office 3,358,521
Patented Dec. 19, 1967

3,358,521
ADJUSTABLE TIGHTENER
Laurance L. Browning, Jr., Maysville, Ky., assignor to Browning Manufacturing Company, Maysville, Ky., a corporation of Kentucky
Filed Oct. 21, 1965, Ser. No. 500,072
3 Claims. (Cl. 74—242.1)

ABSTRACT OF THE DISCLOSURE

A tightening device comprising a base and an arm, the base having a tapered annular seat and the arm having a mating tapered socket fitted over the seat, and a pivot bolt passing freely through the socket and in threaded engagement with the seat, a snap ring underlying the arm and fixing the bolt against axial displacement relative to the arm, whereby when the bolt is tightened the socket will be drawn into wedge-locking engagement with the seat of the base and when the bolt is loosened, the socket will be displaced relative to the seat to automatically break the wedge-locking engagement of the parts.

---

This invention relates to tighteners of the type employed to take up slack in a belt or chain, and has to do more particularly with a tightener of the type wherein a sheave or pulley carrying arm is rotatably mounted on a base and is capable of being fixedly secured to the base in various positions of use throughout a range of 360°.

Such tighteners may be either single adjusting or double adjusting, depending upon whether or not the base is adjustable relative to the supporting surface to which it is secured. Numerous types of both single and double adjusting tighteners have hitherto been proposed, and in large measure they have relied upon land or groove or equivalent interengaging means to effect a positive connection between the arm and base. For example, a common expedient is to provide the base with a circular pad having a centrally disposed bolt receiving threaded bore, the arm having a similar pad at one end thereof with a center bore through which a bolt is passed. The pads are provided with mating lands and grooves so that the arm will be fixed against rotation relative to the base when the bolt is tightened. While it will be evident that such arrangement permits adjustment of the arm relative to the base throughout a range of 360°, the adjustment is actually incremental, being dependent upon the number of lands and grooves employed with the result that adjustment is incremental and not truly universal in the sense that the arm can be fixedly secured in any desired rotative position relative to the base. Usually the incremental adjustment will be in the range of 12°–15°, which means that the user must necessarily compromise the adjustment which may be required. This is true both in the single adjusting and double adjusting tighteners since, in the latter, adjusting movement of the base—which is usually in an arcuate path—has the effect of displacing the sprocket or sheave laterally with respect to the desired point of contact with the chain or belt, as the case may be.

In contrast to the foregoing, the instant invention provides a tightener which is universally adjustable throughout the full 360° range, the arm being capable of being locked relative to the base at any desired angle of use.

A further object of the instant invention is the provision of a tightener construction which may be used in conjunction with either single or multiple adjusting tighteners, the user having only to set the arm at the desired angle relative to the base and lock it in place by the simple expedient of tightening a bolt.

A further object of the invention is the provision of a tightener construction of the character described wherein the tightener arm is provided at one end with a socket the inner wall surface of which is of tapered or conical configuration, the socket being fitted over a correspondingly tapered seat forming a part of the base, with the socket being drawn into wedge-locking engagement with the seat when the bolt is tightened, thereby fixedly securing the parts together.

Still a further object of the invention is the provision of a tightener of the character described wherein, upon loosening movement of the bolt, the socket will be displaced axially away from the underlying seat and the parts effectively separated in an essentially automatic operation.

The foregoing together with other objects of the invention which will appear hereinafter or which will be apparent to the skilled worker in the art upon reading this specification, are accomplished by those constructions and arrangements of parts of which exemplary embodiments shall now be described.

Reference is made to the accompanying drawings wherein.

Figure 1:
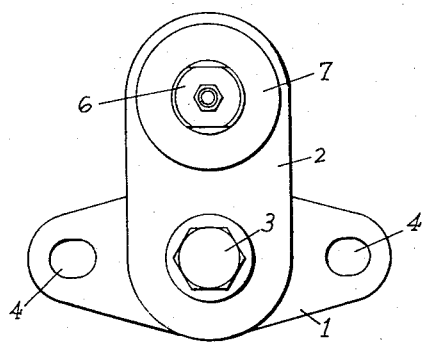
FIGURE 1 is a front elevational view of an adjustable tightener in accordance with the instant invention.
Figure 2:
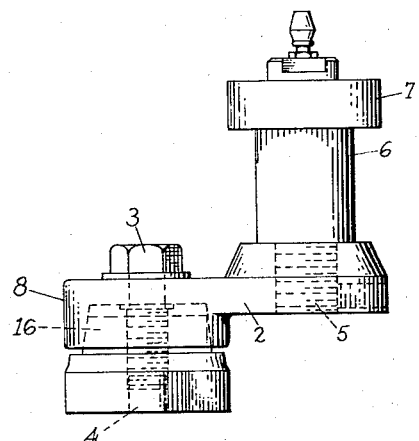
FIGURE 2 is a side elevational view of the tightener illustrated in FIGURE 1.

Referring first to FIGURES 1 and 2 of the drawings, the tightener comprises a base 1 mounting an adjustable arm 2, the arm being detachably secured to the base by means of the bolt 3. The base 1 is provided with bolt holes 4 by means of which the base may be secured to a supporting surface. At its free end the arm 2 is tapped, at 5, to receive a shaft 6 which may be used to mount a sprocket, sheave or the like between the arm 2 and a retaining ring 7 fitted over the end of the shaft. Such arrangement is exemplary only, and it is to be understood that the manner in which the sheave, sprocket or the like is fixed to the arm 2 does not constitute a limitation on the invention. Indeed, the instant invention will find utility other than as a drive tightener. For example, a pair of the devices could have their arms provided with socket-like members for receiving the opposite ends of a rod or shaft, thereby mounting such rod or shaft for adjustable movement in a circular path transverse its length.

Figure 3:
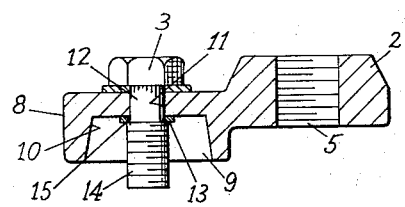
FIGURE 3 is an enlarged vertical sectional view of the tightener arm and mounting bolt.

Referring now to FIGURE 3, and in accordance with the instant invention, the arm 2 is provided at one end with a depending flange 8 defining a socket 9 on the undersurface of the arm, the socket having an inclined or tapered annular wall surface 10. Such wall surface is inclined downwardly and outwardly and is concentric with the opening 11 through which bolt 3 passes. The angle of inclination of the annular wall surface 10 may be varied, although an angle of 4° from the vertical has been found highly satisfactory.

The bolt 3 is of special construction in that it has a non-threaded portion 12 adapted to lie within the confines of opening 11, the non-threaded portion 12 terminating at an outwardly projecting annular shoulder 13 which defines one end of the larger diameter threaded portion 14 of the bolt. The length of the non-threaded portion 12 is such that a snap ring 15 may be seated on the shoulder 13, thereby effectively securing the bolt 3 against axial displacement relative to the arm. The bolt is, however, free to rotate relative to the arm.

Figure 4:
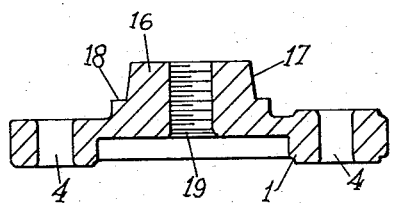
FIGURE 4 is an enlarged vertical sectional view of the tightener base.

Referring now to FIGURE 4, the base 1 is provided with an upwardly projecting annular seat 16 having an inclined or tapered annular wall surface 17 adapted to receive the socket 9 of the arm. Preferably, the angle of inclination of the tapered wall surface 17 will correspond to the angle of inclination of the wall surface 10 of the socket, although the diameter of the seat 16 adjacent the base flange 18 will be slightly greater than the diameter of the socket 9 at its open end. The dimensions will be such that when the socket 9 is fitted over the seat 16, the wall surfaces 10 and 17 will be juxtaposed, but due to the slightly larger diameter of the seat 16, the lowermost edge of annular flange 8 will not seat against base flange 18 but rather will be spaced upwardly therefrom, as will be evident from the dotted line showing in FIGURE 2.

With the arrangement just described, it will be evident that when the threaded portion 14 of bolt 3 is inserted in the threaded center bore 19 in base 1, and the bolt tightened, the arm socket 9 will be drawn into wedge-locking engagement with the seat 16, thereby fixedly securing the parts together in any desired angular position. It should also be evident that when the bolt is loosened, it will be displaced axially with respect to the base 1 and, due to the snap ring 15 which prevents axial movement of the bolt relative to the arm, the arm will also be displaced axially, thereby breaking the wedge-lock engagement between the arm socket and the base seat. When the bolt is loosened, the arm may be readily rotated relative to the base until the desired adjusted position is achieved, whereupon the tightening of the bolt will again bring the parts into wedge-locking engagement.

It should be readily apparent that the rotational adjustment of the arm relative to the base is truly universal throughout the full 360° range and is therefor free from the incremental adjustment characteristic of prior art devices embodying land and groove or similar interengaging means to establish the desired position of use.

Figure 5:
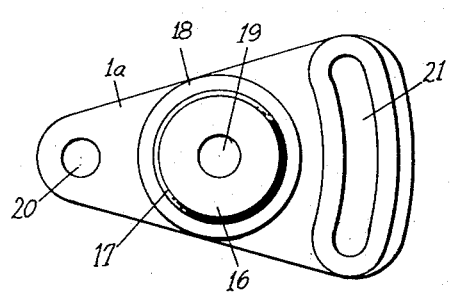
FIGURE 5 is a plan view of an adjustable base.

As previously indicated, the tightener of the instant invention may be used both in conjunction with a fixed base, such as the base illustrated in FIGURE 1, or it may be used in conjunction with bases which are in themselves adjustable, thereby providing for multiple adjustment of the parts. One such adjustable base is illustrated in FIGURE 5 wherein it will be seen that the base 1a is of generally triangular configuration, being provided at one end with a bolt hole 20 and at its opposite end with an arcuate slot 21 preferably formed as a radius of the center axis of bolt hole 20. It will be understood that a bolt will extend through slot 21 which, when loosened, together with the pivot bolt passing through the bolt hole 20, will permit pivoting movement of the base within the range of arcuate slot 21, whereupon the tightening of the bolts will result in securing the base in its desired position of use.

Figure 6:
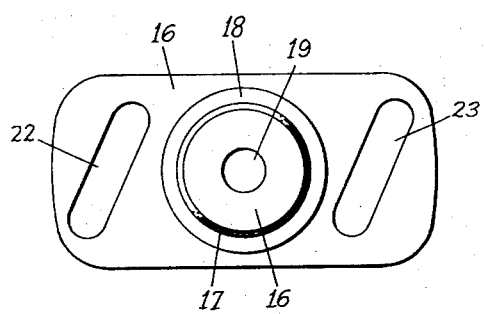
FIGURE 6 is a plan view of another form of adjustable base.

FIGURE 6 illustrates yet another form of adjustable base wherein the base 1b is provided at its opposite ends with elongated slots 22 and 23 which lie in parallel relation to each other and are inclined with respect to the base. Such arrangements permits a much wider latitude in the mounting of the base, as where the base might be secured to a spaced apart pair of angle bars or the like and their spacing is such that fixed bolt holes, such as those illustrated at 4 in FIGURE 1, would not align themselves with the supports.

Modifications may be made in the invention without departing from its spirit and purpose, and consequently it is not intended that the subject matter shall be limited other than in the manner set forth in the claims which follow.

The embodiments of the invention in which an exclusive property or privilege is claimed are defined as follows:

1. A tightening device comprising a base and an arm, said base having an annular seat thereon having a tapered annular wall surface, a threaded center bore in said seat, said arm having a depending annular flange defining a socket, a bore extending through said arm centrally disposed with respect to said socket, said socket having an annular wall surface of a size to mate with the tapered annular wall surface of said seat, the cross-sectional dimensions of said socket and seat being so related that when said socket is placed over said seat and said arm drawn toward said base, the annular wall of said socket will enter into wedge-locking engagement with the annular wall of said seat, and a pivot bolt for drawing said arm toward said base, said pivot bolt having a head overlying said arm, a non-threaded portion extending through the bore in said arm, a shoulder underlying said arm and a threaded portion extending beyond said shoulder engaging the threaded bore in said seat, a snap ring engaging said shoulder and coacting with the head of said bolt to mount said bolt against axial displacement relative to said arm while permitting rotation thereof, whereby when said bolt is tightened, the arm will be moved toward said base and the annular wall surface of said socket drawn into wedge-locking engagement with the annular wall surface of said seat and when said bolt is loosened, said arm will be moved away from said base and said socket lifted out of engagement with said seat so that the arm may be freely rotated relative to said base to any desired position.

2. The tightening device claimed in claim 1 wherein said base has a plurality of spaced openings therein through which attachment bolts are passed to secure said base to a support, and wherein at least one of said openings comprises an elongated slot, whereby the position of said base may be adjusted relative to its support.

3. A tightening device comprising a base and an arm, said base having an annular seat projecting outward from one face thereof, said seat having a tapered annular wall surface surrounding a threaded center bore, said annular wall surface tapering downwardly and outward so that said seat is of a larger diameter adjacent said base than at the surface thereof remote from said base, said arm comprising an elongated member having a bore at one end thereof surrounded by a depending annular flange defining a socket in communication with said last named bore, means at the opposite end of said arm mounting a shaft to which a sheave, a sprocket or the like is rotatably secured, said socket having a tapered annular wall surface corresponding to the tapered wall surface of said seat, the diameter of said socket at the outermost edge of said annular flange being smaller than the diameter of said annular seat adjacent said base but larger than the diameter of said seat at the surface thereof remote from said base, a bolt having a non-threaded portion extending through the bore in said arm and a threaded portion extending therebeyond engaging the threaded bore in said seat, a snap ring surrounding said bolt at the juncture of said threaded and non-threaded portions and in engagement therewith, said snap ring contacting the base of said socket and acting to hold said bolt against axial movement relative to said arm, whereby when said bolt is tightened, the arm will be moved toward said base and the annular wall surface of said socket drawn into wedge-locking engagement with the annular wall surface of said base and when said bolt is loosened, said arm will be moved away from said base and said socket lifted out of engagement with said seat so that the arm may be rotated relative to said base to any desired position.

(References on following page)

References Cited

UNITED STATES PATENTS

| | | | |
|---|---|---|---|
| 1,689,750 | 10/1928 | Redfield | 74—242.11 X |
| 2,387,910 | 10/1945 | Ingwer et al. | 248—16 X |
| 3,085,821 | 4/1963 | Ryck | 287—53 |
| 3,279,870 | 10/1966 | Janiszewski | 287—53 X |

FOREIGN PATENTS

| | | |
|---|---|---|
| 545,128 | 8/1957 | Canada. |
| 675,111 | 12/1963 | Canada. |

FRED C. MATTERN, Jr., *Primary Examiner.*

J. A. WONG, *Assistant Examiner.*